US012573945B2

(12) United States Patent
Gondo et al.

(10) Patent No.: US 12,573,945 B2
(45) Date of Patent: Mar. 10, 2026

(54) CHARGER

(71) Applicant: Yazaki Corporation, Tokyo (JP)

(72) Inventors: Ryo Gondo, Susono (JP); Michito Enomoto, Susono (JP); Daisuke Maezaki, Susono (JP); Yoshiya Ohnuma, Nagaoka (JP); Shohei Komeda, Tokyo (JP); Shunsuke Takuma, Nagaoka (JP)

(73) Assignee: YAZAKI CORPORATION, Tokyo (JP)

( * ) Notice: Subject to any disclaimer, the term of this patent is extended or adjusted under 35 U.S.C. 154(b) by 198 days.

(21) Appl. No.: 18/581,834

(22) Filed: Feb. 20, 2024

(65) Prior Publication Data

US 2024/0291383 A1 Aug. 29, 2024

(30) Foreign Application Priority Data

Feb. 27, 2023 (JP) ................................. 2023-028107

(51) Int. Cl.
H02J 7/06 (2006.01)
H02J 7/00 (2006.01)
(Continued)

(52) U.S. Cl.
CPC ....... H02M 1/4233 (2013.01); H02J 7/00711 (2020.01); H02J 7/06 (2013.01);
(Continued)

(58) Field of Classification Search
CPC .. H02J 7/00; H02J 7/00711; H02J 7/02; H02J 7/06; H02J 7/345; H02J 2207/20;
(Continued)

(56) References Cited

U.S. PATENT DOCUMENTS

2015/0195878 A1* 7/2015 Garrity .................. H05B 45/39
315/186
2022/0060045 A1 2/2022 Imoto et al.
(Continued)

OTHER PUBLICATIONS

Shohei Komeda; Yoshiya Ohnuma; "An Isolated Single-Phase AC-DC Converter based on a Dual Active Bridge Converter and an Active Energy Buffer Circuit"; Nov. 1, 2021; IEEE; 2021 IEEE 30th International Symposium on Industrial Electronics (ISIE); pp. 1-6 (Year: 2021).*
(Continued)

*Primary Examiner* — Thienvu V Tran
*Assistant Examiner* — Shahzeb K Ahmad
(74) *Attorney, Agent, or Firm* — Sughrue Mion, PLLC

(57) ABSTRACT

A charger is configured such that in case where control of switching of a DC/DC converter includes a first mode and a second mode, a dead time is provided between the first mode and the second mode when switching from the first mode to the second mode and a first switch of a power pulsation absorbing circuit is controlled to be in an off-state during a time until expiration of a predetermined time after start of the dead time, wherein in the first mode, at least one switch of switches of the DC/DC converter is switched on, at least one switch of the switches of the DC/DC converter is switched off, and the first switch of the power pulsation absorbing circuit is switched off, and wherein in the second mode, the switch of the DC/DC converter which is switched off in the first mode is switched on, and the first switch of the power pulsation absorbing circuit is switched on.

10 Claims, 12 Drawing Sheets

(51) Int. Cl.

| | |
|---|---|
| *H02M 1/00* | (2007.01) |
| *H02M 1/14* | (2006.01) |
| *H02M 1/15* | (2006.01) |
| *H02M 1/42* | (2007.01) |
| *H02M 3/335* | (2006.01) |
| *H02J 7/34* | (2006.01) |

(52) U.S. Cl.

CPC ......... *H02M 1/0058* (2021.05); *H02M 1/007* (2021.05); *H02M 1/143* (2013.01); *H02M 1/15* (2013.01); *H02M 1/42* (2013.01); *H02M 1/4225* (2013.01); *H02M 3/33573* (2021.05); *H02J 7/345* (2013.01); *H02M 1/4241* (2013.01)

(58) Field of Classification Search

CPC ............. H02M 1/0003; H02M 1/0038; H02M 1/0058; H02M 1/007; H02M 1/143; H02M 1/15; H02M 1/38; H02M 1/385; H02M 1/42; H02M 1/4225; H02M 1/4233; H02M 1/4241; H02M 3/335; H02M 3/33507; H02M 3/33538; H02M 3/33569; H02M 3/33573; H02M 3/33576; H02M 7/02; H02M 7/12; H02M 7/155; H02M 7/1555; H02M 7/162; H02M 7/1623; H02M 7/21; H02M 7/217; H02M 7/219

See application file for complete search history.

(56) References Cited

U.S. PATENT DOCUMENTS

| | | | | |
|---|---|---|---|---|
| 2022/0385087 A1* | 12/2022 | Sarnago Andia . | H02M 3/33584 | |
| 2023/0179086 A1* | 6/2023 | Jun ....................... | H02M 1/385 | |
| | | | 363/71 | |
| 2024/0162810 A1* | 5/2024 | Suzuki ................ | H02M 7/2176 | |

OTHER PUBLICATIONS

Shohei Komeda et al., "A Dual Active Bridge AC-DC Converter with an Active Energy Buffer", Material of the Technical Committee on Semiconductor Power Converter, 2021, SPC-21-003, pp. 13-18.

Shohei Komeda et al., "Boost Operation of a Dual-Active-Bridge AC-DC Converter with an Active Energy Buffer", 2022, IEEE Energy Conversion Congress and Exposition (ECCE), 2022, pp. 1-6, Detroit, MI, USA, doi: 10.1109/ECCE50734.2022.9948064.

* cited by examiner

| | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | off | off | off | off |
| MODE 6 | off | on | on | off | off | on | on | off | off |
| MODE 7 | off | on | on | off | off | on | on | off | on |

FIG.3

CHARGER

BACKGROUND OF THE INVENTION

Technical Field

The present invention relates to a charger.

Background Art

Various isolated single phase AC/DC converters have been considered as chargers for electric vehicles. Generally, a circuit arrangement is utilized as a charger for an electric vehicle, wherein the circuit arrangement includes a diode rectifier with a power factor correction (PFC) circuit, a high capacitance capacitor for a DC link, and high frequency isolated DC/DC converter. The high capacity capacitor for a DC link is required to have a capacitance which enables power pulsation due to a single-phase AC power supply to be absorbed. With the above-mentioned circuit arrangement, it is difficult to reduce a size of the capacitor.

As a compact charger which enables power pulsation to be absorbed, Patent Document 1 and Non-Patent Document 1 disclose a charger including a Dual-Active-Bridge (DAB) converter with a power pulsation absorbing circuit added, and control of such a charger, wherein the power pulsation absorbing circuit includes an active buffer intended for power pulsation absorption.

CITATION LIST

Patent Literature

Patent Document 1: JP 2022-34820 A

Non-Patent Literature

Non-Patent Document 1: Shohei Komeda, Yoshiya Ohnuma, "A Dual Active Bridge AC-DC Converter with an Active Energy Buffer", Material of the Technical Committee on Semiconductor Power Converter, 2021, SPC-21-003, pp. 13-18

SUMMARY OF THE INVENTION

The charger according to Patent Document 1 and Non-Patent Document 1 is provided such that switches of a DAB converter and a first switch of a power pulsation absorbing circuit are switched in a linked manner to obtain a waveform of a current through an inductor of the DAB converter which is approximable by a rectangular waveform, which facilitates determination of a control rule.

The DAB converter includes full bridge circuits on both of primary and secondary sides. In general, a circuit including a full bridge circuit has a dead time before switching from an off-state to an on-state, wherein during the dead time, all switches of a leg are switched off which includes a switch to be switched. Depending on a timing of switching the first switch of the power pulsation absorbing circuit from an off-state to an on-state, hard switching may occur during mode switching with the dead time provided, which may reduce efficiency.

An objective of the present invention is to provide a compact and efficient charger which enables pulsation of power to be absorbed.

In order to achieve the objective, a charger according to an embodiment of the present invention includes a rectifier including two input terminals, a cathode terminal and an anode terminal, wherein the two input terminals are configured for connection to an AC power supply; a DC/DC converter including a first terminal, a second terminal and two output terminals, the first terminal being configured to be connected to the cathode terminal of the rectifier via a first line, the second terminal being configured to be connected to the anode terminal of the rectifier via a second line, wherein the output terminals are configured for connection to a battery: a power pulsation absorbing circuit including a first diode, a second diode, a third diode, an inductor, a capacitor, a first switch and a second switch; and a controller configured to control switching of switches of the DC/DC converter and switching of the first switch and the second switch, wherein the first diode is connected between the inductor of the power pulsation absorbing circuit and one of the two input terminals of the rectifier, and the second diode is connected between the inductor and another of the two input terminals of the rectifier, wherein the capacitor and the first switch are connected in series between the first line and the second line with the capacitor being arranged closer to the second line than the first switch, wherein the third diode is connected between the inductor of the power pulsation absorbing circuit and a line which connects the capacitor to the first switch, wherein the second switch is connected between the second line and a line which connects the inductor of the power pulsation absorbing circuit to the third diode, wherein in case where control of switching of the DC/DC converter by the controller includes a first mode and a second mode, the controller is configured to: provide a dead time between the first mode and the second mode when switching from the first mode to the second mode; and control the first switch of the power pulsation absorbing circuit to be in an off-state during a time until expiration of a predetermined time after start of the dead time, wherein in the first mode, at least one switch of the switches of the DC/DC converter is switched on, at least one switch of the switches of the DC/DC converter is switched off, and the first switch of the power pulsation absorbing circuit is switched off, and wherein in the second mode, the switch of the DC/DC converter which is switched off in the first mode is switched on, and the first switch of the power pulsation absorbing circuit is switched on.

The present invention enables a compact and efficient charger to be provided which can absorb pulsation of power.

BRIEF DESCRIPTION OF THE DRAWINGS

FIG. 3 shows states of each of switches in various modes;

DETAILED DESCRIPTION OF THE PREFERRED EMBODIMENTS

<Charger 100>

Figure 1:
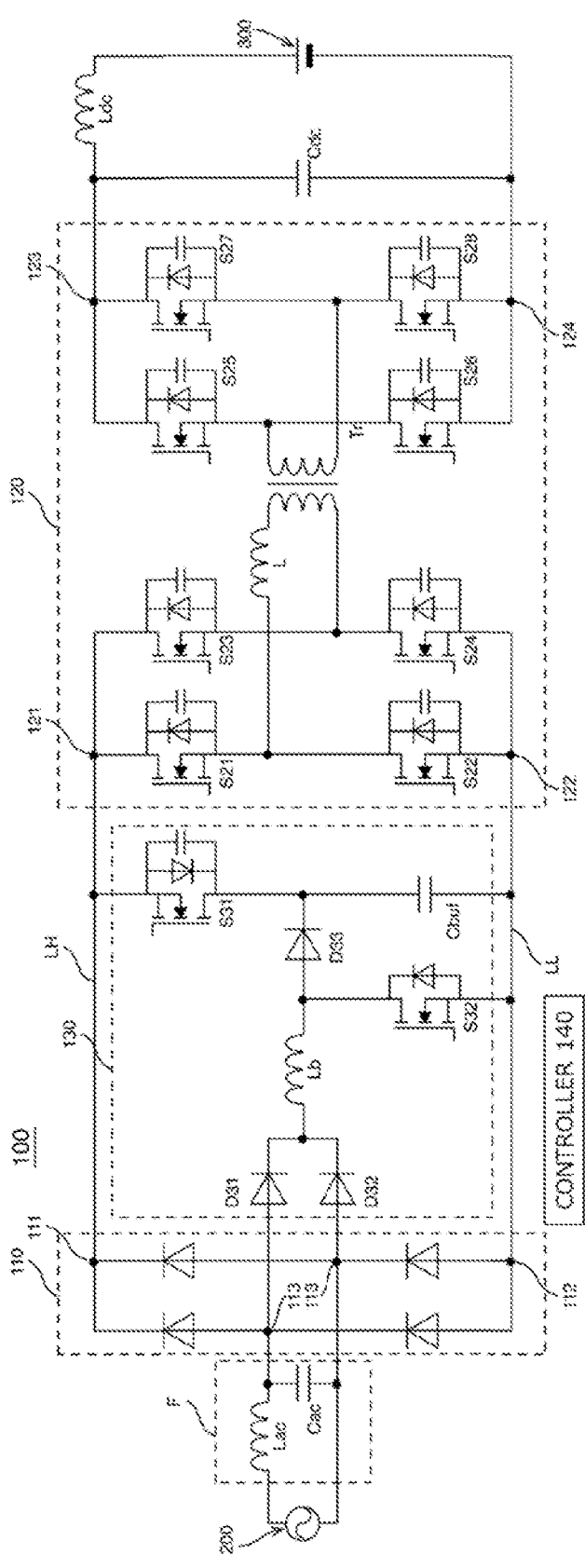
FIG. 1 shows a charger 100 according to an embodiment of the present invention.

FIG. 1 shows a charger 100 according to an embodiment of the present invention. The charger 100 includes a rectifier 110, a DC/DC converter 120, a power pulsation absorbing circuit 130, and a controller 140. The charger 100 converts the single-phase AC voltage $v_S$ inputted from the single-phase AC power supply 200 to a DC voltage $V_{dc}$, and outputs it to a battery 300.

The rectifier 110 includes a cathode terminal 111 and an anode terminal 112 connected to DC/DC converter 120, and two input terminals 113 for connection to the AC power supply 200. For example, the rectifier 110 is configured as a bridge diode rectifier formed by four diodes, receives an AC current applied between the two input terminals 113 connected to the AC power supply, converts the current into a DC current and outputs it from the cathode terminal 111, as shown in FIG. 1. As shown in FIG. 1, the rectifier 110 may be configured to be connected to the AC power supply 200 via a filter F, wherein the filter F includes an inductor Lac and a capacitor Cac.

For example, the DC/DC converter 120 is configured as a DAB (Dual Active Bridge) converter. The DC/DC converter 120 includes a first terminal 121, a second terminal 122, a third terminal 123 and a fourth terminal 124, the first terminal 121 being connected to the cathode terminal 111 of the rectifier 110, the second terminal 122 being connected to the anode terminal 112 of the rectifier 110, wherein the third and fourth terminals 123 and 124 are configured for connection to a positive electrode and a negative electrode of the battery 300, respectively. The DC/DC converter 120 includes a transformer Tr, a full bridge circuit with four switches on an input side (primary side), i.e., a first switch S21, a second switch S22, a third switch S23 and a fourth switch S24, and a full bridge circuit with four switches on an output side (secondary side), i.e., a fifth switch S25, a sixth switch S26, a seventh switch S27 and an eighth switch S28, wherein the transformer Tr is arranged between the full bridge circuit on the input side and the full bridge circuit on the output side. For example, each of the eight switches S21~S28 is configured as an N-channel power MOSFET (Metal-Oxide-Semiconductor Field-Effect Transistor) with a reverse polarity diode (body diode). In this case, the N-channel power MOSFET may include a snubber capacitor, as shown in FIG. 1.

The full bridge circuit on the primary side of the DC/DC converter 120 includes two legs connected between the first terminal 121 and the second terminal 122 (a leg including a first switch S21 and a second switch S22 and a leg including a third switch S23 and a fourth switch S24), while the full bridge circuit on the secondary side of the DC/DC converter 120 includes two legs between the third terminal 123 and the fourth terminal 124 (a leg including a fifth switch S25 and a sixth switch S26 and a leg including a seventh switch S27 and an eighth switch S28).

The DC/DC converter 120 includes an inductor L on the primary side of the transformer Tr. For example, this inductor L is a leakage inductor of the transformer Tr.

Further, a DC capacitor Cdc is connected between the third terminal 123 and the fourth terminal 124 of DC/DC converter 120. An inductor Ldc may be connected between the third terminal 123 of the DC/DC converter 120 and the positive electrode of the battery 300.

The power pulsation absorbing circuit 130 includes a first diode D31, a second diode D32, a third diode D33, an inductor Lb, a buffer capacitor Cbuf, a first switch S31, and a second switch S32.

The first diode D31 of power pulsation absorbing circuit 130 is connected between the inductor Lb of the power pulsation absorbing circuit 130 and one of the two input terminal 113 of the rectifier 110. The second diode D32 of power pulsation absorbing circuit 130 is connected between the inductor Lb of the power pulsation absorbing circuit 130 and the other of the two input terminal 113 of the rectifier 110. In this case, each of the first diode D31 and second diode D32 of the power pulsation absorbing circuit 130 is connected between the inductor Lb of the power pulsation absorbing circuit 130 and the input terminals 113 of the rectifier 110 so that these diodes have a forward direction extending from the input terminals 113 of the rectifier 110 to the inductor Lb. Therefore, even when the AC power supply 200 is connected to the input terminals 113 of the rectifier 110, a DC current is applied to the inductor Lb of power pulsation absorbing circuit 130.

The buffer capacitor Cbuf of the power pulsation absorbing circuit 130 and the first switch S31 are connected in series between a first line LH and a second line LL, wherein the first line LH connects the cathode terminal 111 of the rectifier 110 to the first terminal 121 of the DC/DC converter 120, and the second line LL connects the anode terminal 112 of the rectifier 110 to the second terminal 122 of the DC/DC converter 120. The buffer capacitor Cbuf is arranged closer to the second line LL, and the first switch 31 is arranged closer to the first line LH. The first switch S31 is configured as an N-channel power MOSFET (Metal-Oxide-Semiconductor Field-Effect Transistor) with a reverse polarity diode (body diode). In this case, a source and a drain of the N-channel power MOSFET may be preferably connected to the first line LH and the buffer capacitor, respectively.

The third diode D33 of the power pulsation absorbing circuit 130 is connected between line connecting the buffer capacitor Cbuf of the power pulsation absorbing circuit 130 to the first switch S31 on the one hand and the inductor Lb of the power pulsation absorbing circuit 130 on the other hand so that the third diode D33 has a forward direction along a direction extending from the inductor Lb to this line.

The second switch S32 of the power pulsation absorbing circuit 130 is connected between the second line LL and a line connecting the inductor Lb of the power pulsation absorbing circuit 130 to the third diode D33. The second switch S32 is configured as an N-channel power MOSFET (Metal-Oxide-Semiconductor Field-Effect Transistor) with a reverse polarity diode (body diode). In this case, a drain of the N-channel power MOSFET may be preferably connected to the line connecting the inductor Lb of the power pulsation absorbing circuit 130 to the third diode D33, wherein a source of the N-channel power MOSFET may be preferably connected to the second line LL.

The controller 140 controls switching of the switches S21 to S28 of the DC/DC converter 120 as well as switching of the switches S31 and S32 of the power pulsation absorbing circuit 130.

Since the power pulsation absorbing circuit 130 includes a first diode D31, a second diode D32, a third diode D33, an inductor Lb, a buffer capacitor Cbuf, a first switch S31, and a second switch S32, the power pulsation absorbing circuit 130 may serve as a power factor correction (PFC) circuit. Therefore, according to the present embodiment, control is possible which provides the following sinusoidal voltage $v_S$ and sinusoidal current is to the charger 100 from the AC power supply 200:

$$v_S(t) = \sqrt{2}\, V_S \sin\omega_S t$$
$$i_S(t) = \sqrt{2}\, I_S \sin\omega_S t$$

wherein $V_S$ indicates an effective value of the power supply voltage and $I_S$ indicates an effective value of the power supply current.

Figure 2:
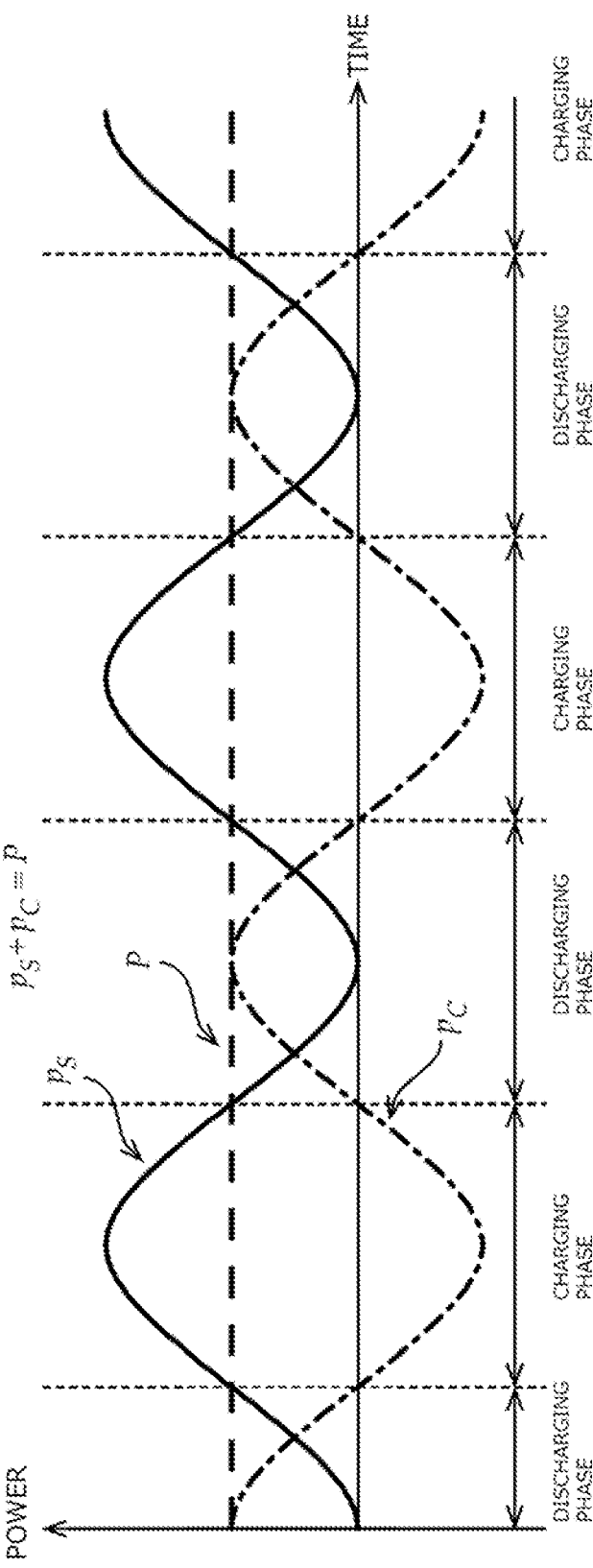
FIG. 2 shows a relation between an instantaneous power $p_S$ outputted from an AC power supply and an instantaneous power pc outputted from a buffer capacitor Cbuf.

In this case, an instantaneous power $p_S$ outputted from the AC power supply 200 is formed by a sum of an average power P $(=V_S I_S)$ and a pulsation component $p_{rip}$(t) $(=-V_S I_S \cos 2\omega st)$ as shown below, wherein the instantaneous power $p_S$ pulsates around the average power P (dashed line in FIG. 2) with an angular frequency which is twice as high as an angular frequency ω of the AC, as shown with a solid line in FIG. 2.

$$p_S(t) = v_S i_S = V_S I_S(1 - \cos 2\omega_S t) = P + p_{rip}(t)$$

For the above-mentioned reasons, the controller 140 controls switching of the switches S21 to S28 of the DC/DC converter 120 as well as switching of the switches S31 and S32 of the power pulsation absorbing circuit 130 to absorb power pulsation due to the AC power supply in the power pulsation absorbing circuit 130 so that a constant power is inputted to the DC/DC converter 120.

In this case, the charger 100 according to the present embodiment is provided such that different controls are applied for the instantaneous power from the AC power supply 200 being higher than the average power $(p_S>P)$ and for the instantaneous power being lower than the average power $(p_S<P)$.

In the case of the instantaneous power $p_S$ from the AC power supply being higher than the average power P $(p_S>P)$, switching of the eight switches S21 to S28 of the DC/DC converter 120 and the two switches S31 and S32 of the power pulsation absorbing circuit 130 are controlled to charge the pulsation component $p_{rip}$ of the instantaneous power $p_S$ from the AC power supply 200 to the buffer capacitor Cbuf via the inductor Lb of the power pulsation absorbing circuit 130, whereby only the average power P of the power outputted from the AC power supply may be provided to the DC/DC converter 120. This means that according to the present embodiment, the buffer capacitor Cbuf is charged in a phase in which a higher instantaneous power $p_S$ than the average power P is outputted from the AC power supply (charging phase), wherein a negative instantaneous power $p_C$ is outputted from the buffer capacitor Cbuf, as shown with a dashed dotted line in FIG. 2.

On the other hand, in the case of the instantaneous power $p_S$ from the AC power supply 200 being lower than the average power P $(p_S<P)$, switching of the eight switches S21 to S28 of the DC/DC converter 120 and the first switch S31 of the power pulsation absorbing circuit 130 are controlled while maintaining the second switch S32 of the power pulsation absorbing circuit 130 in an off-state to actively discharge the buffer capacitor Cbuf via the first switch S31. This compensates the pulsation component $p_{rip}$, i.e., a difference between the instantaneous power $p_S$ and the average power P outputted from the AC power supply 200 to input the average power P to the DC/DC converter 120. This means that according to the present embodiment, the buffer capacitor Cbuf is discharged in a phase in which a lower instantaneous power $p_S$ than the average power P is outputted from the AC power supply (discharging phase), wherein a positive instantaneous power $p_C$ is outputted from the buffer capacitor Cbuf, as shown with a dashed dotted line in FIG. 2.

In other words, according to the present embodiment, the controller 140 controls switching of the switches S21 to S28 of the DC/DC converter 120, the switches S31 and S32 of the power pulsation absorbing circuit 130 to obtain a constant sum of the instantaneous power $p_S$ outputted from the AC power supply 200 and the instantaneous power pc outputted from the buffer capacitor Cbuf.

In this manner, the present embodiment is provided such that the buffer capacitor Cbuf is actively discharged during the discharging phase. Consequently, the present embodiment enables an amount of power accumulated in the buffer capacitor Cbuf (i.e., capacitance of the buffer capacitor Cbuf) to be limited, whereby the buffer capacitor Cbuf can be reduced in size.

Further, according to the present embodiment, the second switch S32 is activated only during the charging phase. Consequently, the present embodiment enables an amount of power accumulated in the inductor Lb (i.e., inductance of the inductor Lb) to be limited, whereby the inductor Lb can be reduced in size.

Further, according to the present embodiment, a power without pulsation is inputted to the DC/DC converter 120. Consequently, the present embodiment enables the transformer Tr of the DC/DC converter 120 and/or the DC capacitor Cdc to be reduced in size.

In this manner, the present embodiment enables passive elements to be reduced in size, for example capacitors and inductors. Consequently, the present embodiment enables a compact charger to be provided which can absorb pulsation of power.

<Switching Modes and Operation Waveform>

The controller 140 controls switching of the switches S21 to S28 of the DC/DC converter 120 and the first switch S31 of the power pulsation absorbing circuit 130 according to seven modes to obtain an operation waveform it of the inductor L of the DC/DC converter 120 which is approximable by a rectangular waveform. FIG. 3 shows respective states of each of switches in the seven modes. The seven modes a mode (mode 5) in which the switches S21 to S28 of the DC/DC converter 120 and the first switch S31 of the power pulsation absorbing circuit 130 are all switched off.

Figure 4:
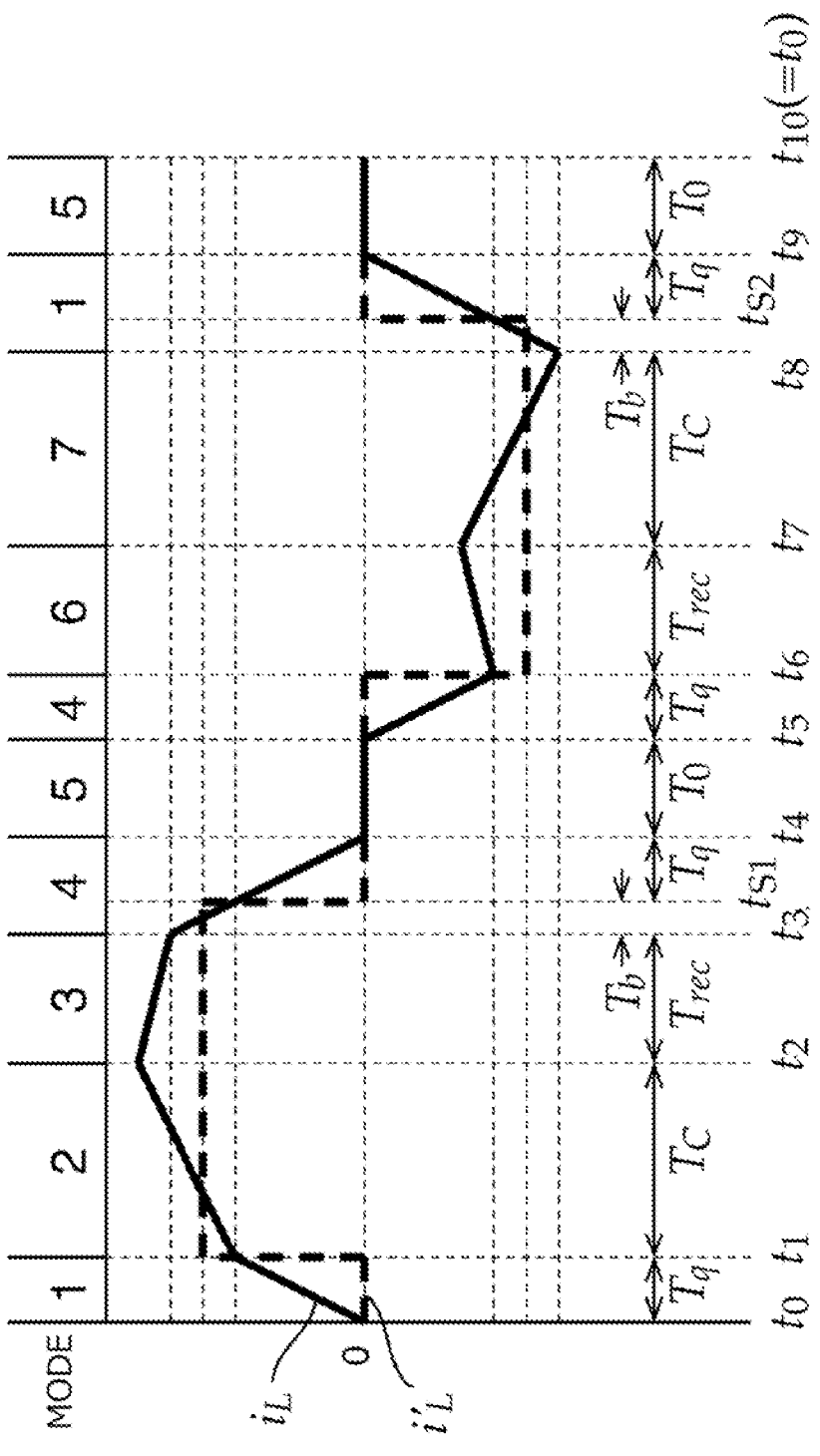
FIG. 4 shows an operation waveform $i_L$ of an inductor L of a DC/DC converter 120 according to the embodiment and a corresponding equivalent rectangular waveform $i_L'$ (discontinuous current mode)

FIG. 4 shows an operation waveform $i_L$ of an inductor L of a DC/DC converter 120 according to the present embodiment and a corresponding equivalent rectangular waveform $i_L'$. This operation waveform it is obtained by switching the seven modes as shown in FIG. 3 to mode 1, mode 2, mode 3, mode 4, mode 5, mode 4, mode 6, mode 7, mode 1 and mode 5 in this order. In this case, a current $i_L$ is obtained in each of the seven modes as follows (Patent Document 1 and Non-Patent Document 1):

$$i_L(t) = \begin{cases} \frac{v_C + V_{dc}}{L}(t - t_{c1}) + i_L(t_{c1}) & \text{(Mode 1)} \\ \frac{v_C - V_{dc}}{L}(t - t_{c2}) + i_L(t_{c2}) & \text{(Mode 2)} \\ \frac{v_{rec} - V_{dc}}{L}(t - t_{c3}) + i_L(t_{c3}) & \text{(Mode 3)} \\ -\frac{v_C + V_{dc}}{L}(t - t_{c4}) + i_L(t_{c4}) & \text{(Mode 4)} \\ 0 & \text{(Mode 5)} \\ -\frac{v_{rec} - V_{dc}}{L}(t - t_{c6}) + i_L(t_{c6}) & \text{(Mode 6)} \\ -\frac{v_C - V_{dc}}{L}(t - t_{c7}) + i_L(t_{c7}) & \text{(Mode 7)} \end{cases} \tag{1}$$

wherein $t_{cn}$ (n=1 to 7) indicates a time at which switching to mode n is performed.

According to the present embodiment, in order to discharge the buffer capacitor Cbuf more actively when the first switch S31 of the power pulsation absorbing circuit 130 is in an on-state, the controller 140 controls a voltage $v_C$ applied to the buffer capacitor Cbuf such that the voltage $v_C$ is always higher than an instantaneous voltage $v_{rec}$ outputted from the rectifier 110. Therefore, according to the present embodiment, the voltage $v_C$ applied to the buffer capacitor Cbuf has a value which is different from the instantaneous voltage $v_{rec}$ of the rectifier 110, and modes 2 and 3 have different gradients of the operation waveform $i_L$. Similarly, modes 6 and 7 have different gradients of the operation waveform $i_L$. In this manner, the present embodiment enables operation waveforms to be generated which are asymmetrical with respect to $i_L$=0 in positive and negative waveforms, as shown in FIG. 4.

For the operation waveform it as shown in FIG. 4, it is possible to approximate it by an equivalent rectangular waveform $i_L'$ if to $t_0$ $t_{10}$ are set such that $|t_0-t_1|=|t_5-t_6|$, $|t_1-t_2|=|t_7-t_8|$, $|t_2-t_3|=|t_6-t_7|$, $|t_3-t_4|=|t_8-t_9|$, and if $t_{S1}$ and $t_{S2}$ are set between $t_3$ and $t_4$ and between $t_8$ and $t_9$ respectively such that $|t_0-t_1|=|t_{S1}-t_4|=|t_{S2}-t_9|$.

$$i_L'(t) = \begin{cases} \frac{i_L(t_1) + i_L(t_3)}{2} = I_L' & (t_1 \le t \le t_{S1}) \\ -I_L' & (t_6 \le t \le t_{S2}) \\ 0 & (t_0 \le t < t_1, t_{S1} < t < t_6, t_{S2} < t < t_{10}) \end{cases}$$

If phases of to $t_0 \le t_1$, $t_{S1} \le t_4$, $t_5 \le t < t_6$, and $t_{S2} \le t < t_9$ of the equivalent rectangular waveform $i_L'$ are defined as reactive current phases $T_q$, phases of $t_1 \le t < t_2$ and $t_7 \le t < t_8$ are defined as buffer capacitor discharge current phases $T_C$, phases of $t_2 \le t < t_3$ and $t_6 \le t < t_7$ are defined as power supply current phases $T_{rec}$, phases of $t_3 \le t < t_{S1}$ and $t_8 \le t < t_{S2}$ are defined as current balance phases $T_b$, and phases of $t_4 \le t < t_5$ and $t_9 < t < t_{10}$ are defined as zero current phases $T_0$, a duty cycle for each of the phases within a switching period $T_{SW}$ is as follows:

$$\begin{cases} D_q = \frac{2T_q}{T_{SW}} = \frac{2I_L'L}{(v_C + V_{dc})T_{SW}} - \frac{D_b}{2} \\ D_C = \frac{2T_C}{T_{SW}} = \frac{i_C}{I_L'} + D_b = \frac{(v_{rec} - V_{dc})i_{rec} + (v_C + V_{dc\_}i_C}{2V_{dc}I_L'} \\ D_{rec} = \frac{2T_{rec}}{T_{SW}} = \frac{i_{rec}}{I_L'} \\ D_b = \frac{2T_b}{T_{SW}} = \frac{(v_{rec} - V_{dc})i_{rec} + (v_c - v_{dc})i_C}{2V_{dc}I_L'} \\ D_0 = \frac{2T_0}{T_{SW}} = 1 - (2D_q + D_C + D_{rec} + D_b) \end{cases} \tag{2}$$

The duty cycle of each of the phases can be obtained by giving $i_{rec}$, $i_C$, $v_C$ and $V_{dc}$. $I_L'$ as set values. The obtained duty cycles of phases may be used to determine a control rule for the operation waveform $i_L$ in FIG. 4. Among these set values, set values $i_{rec}^*$ and $i_C^*$ for $i_{rec}$ and $i_C$ are switched as follows for the discharging phase and charging phase, wherein the power pulsation absorbing circuit 130 is operated to function as a PFC circuit and as a circuit for absorbing power pulsation:

$$i_{rec}^* = \begin{cases} \sqrt{2}\frac{P}{V_S}|\sin\omega_S t| & \text{(Discharging phase)} \\ \frac{P}{\sqrt{2}\,V_S|\sin\omega_S t|} & \text{(Charging phase)} \end{cases}$$

$$i_C^* = \begin{cases} \frac{P}{v_C}\cos 2\omega_s t & \text{(Discharging phase)} \\ 0 & \text{(Charging phase)} \end{cases}$$

<Discontinuous Current Mode and Continuous Current Mode>

The operation waveform as shown in FIG. 4 is obtained by switching the switches S21 to S28 of the DC/DC converter 120 and the first switch S31 of the power pulsation absorbing circuit 130 at a constant switching frequency $f_{SW}$ without changing the switching frequency $f_{SW}$. The operation waveform as shown in FIG. 4 includes zero current phases $T_0$ in which the current $i_L$ flowing through the reactor L is zero. An operation by switching to mode 1, mode 2, mode 3, mode 4, mode 5, mode 4, mode 6, mode 7, mode 1 and mode 5 in this order as shown FIG. 4 is a discontinuous current mode (DCM).

The zero current phase $T_0$ is mode 5, wherein in this phase, all the switches S21 to S28 of DC/DC converter 120 are switched off. However, the switches are practically switched off at times which are offset, wherein this offset causes residual current and thus resonance between the inductor L of the DC/DC converter 120 and parasitic capacitances of the switches S21 to S28. Therefore, in the discontinuous current mode, switching after the zero current phase $T_0$ (switching in a changing process from mode 5 to mode 4, switching in a changing process from mode 5 to mode 1) will become hard switching, which results in switching loss.

Therefore, the switching frequencies $f_{SW}$ the switches S21 to S28 of the DC/DC converter 120 and/or of the switch S31 of the power pulsation absorbing circuit 130 may be preferably changed within one period of the AC voltage $v_S$ inputted from the AC power supply 200 so that no zero current phase $T_0$ exists, namely so that operation in a continuous current mode (CCM) is achieved (Non-Patent Documents 2 and 3). In this manner, it is possible to remove oscillation of a current $i_L$ and a voltage $V_L$ of the inductor L and to avoid hard switching after the zero current phase $T_0$ to control the charger 100 more efficiently in the continuous current mode.

By solving the formula (2) with $D_0=0$, the switching frequency $f_{SW}$ with which no zero current phase $T_0$ exists, i.e., the switching frequency $f_{SW}$ in the continuous current mode, is determined as follows:

$$f_{SW} = \frac{v_C + V_{dc}}{4I'_L L}(1 - D_{rec} - D_C) \qquad (3)$$

Figure 5:
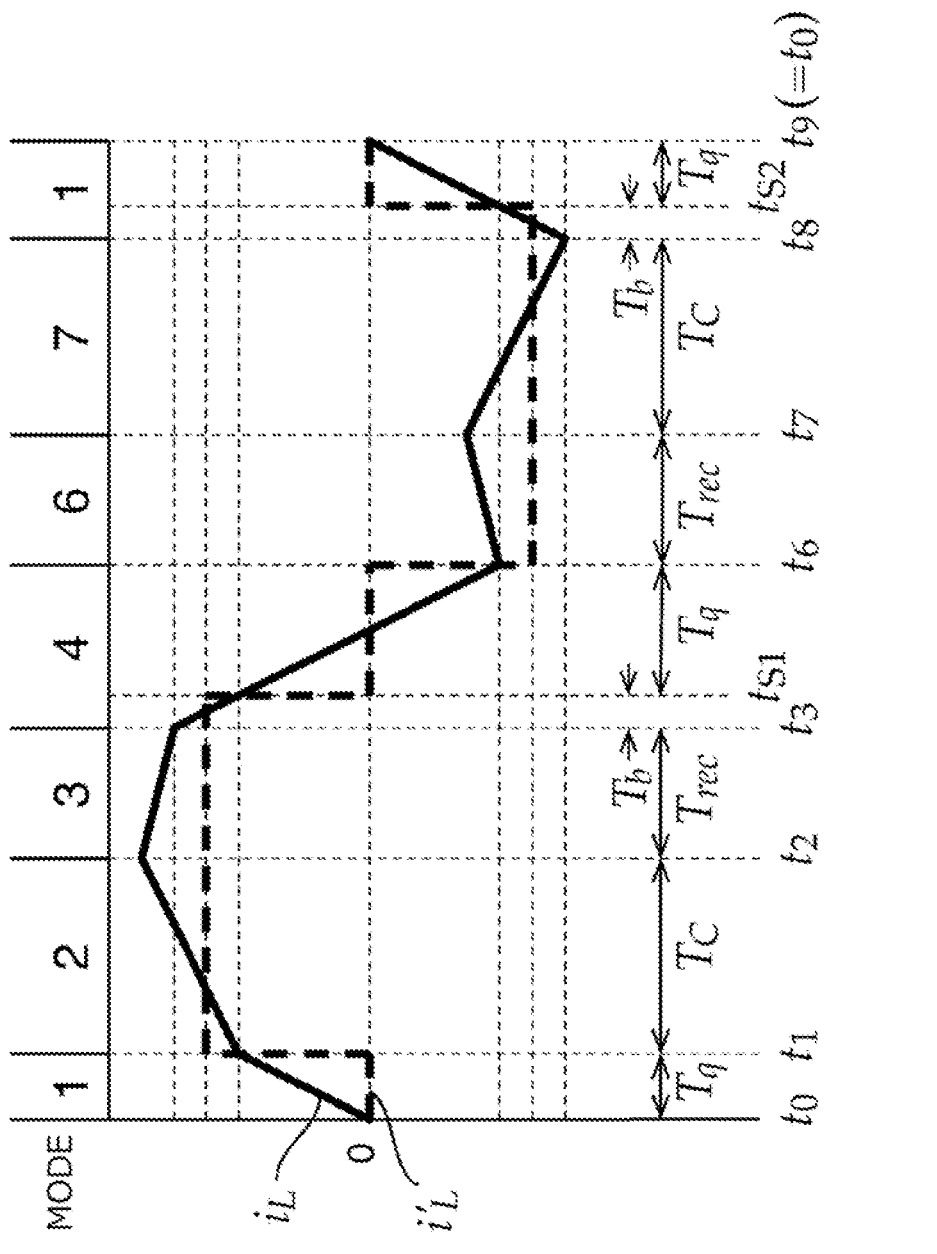
FIG. 5 shows an operation waveform $i_L$ of an inductor L of a DC/DC converter 120 according to the embodiment and a corresponding equivalent rectangular waveform $i_L'$ (continuous current mode)

FIG. 5 shows an operation waveform $i_L$ of the inductor L of the DC/DC converter 120 and a corresponding equivalent rectangular waveform $i_L'$ in the continuous current mode. Since no operation in the mode 5 is carried out in the continuous current mode, the switches S21 to S28 of the DC/DC converter 120 and the switch S31 of the power pulsation absorbing circuit 130 are switched to mode 1, mode 2, mode 3, mode 4, mode 6, mode 7 and mode 1 in this order.

Figure 6:
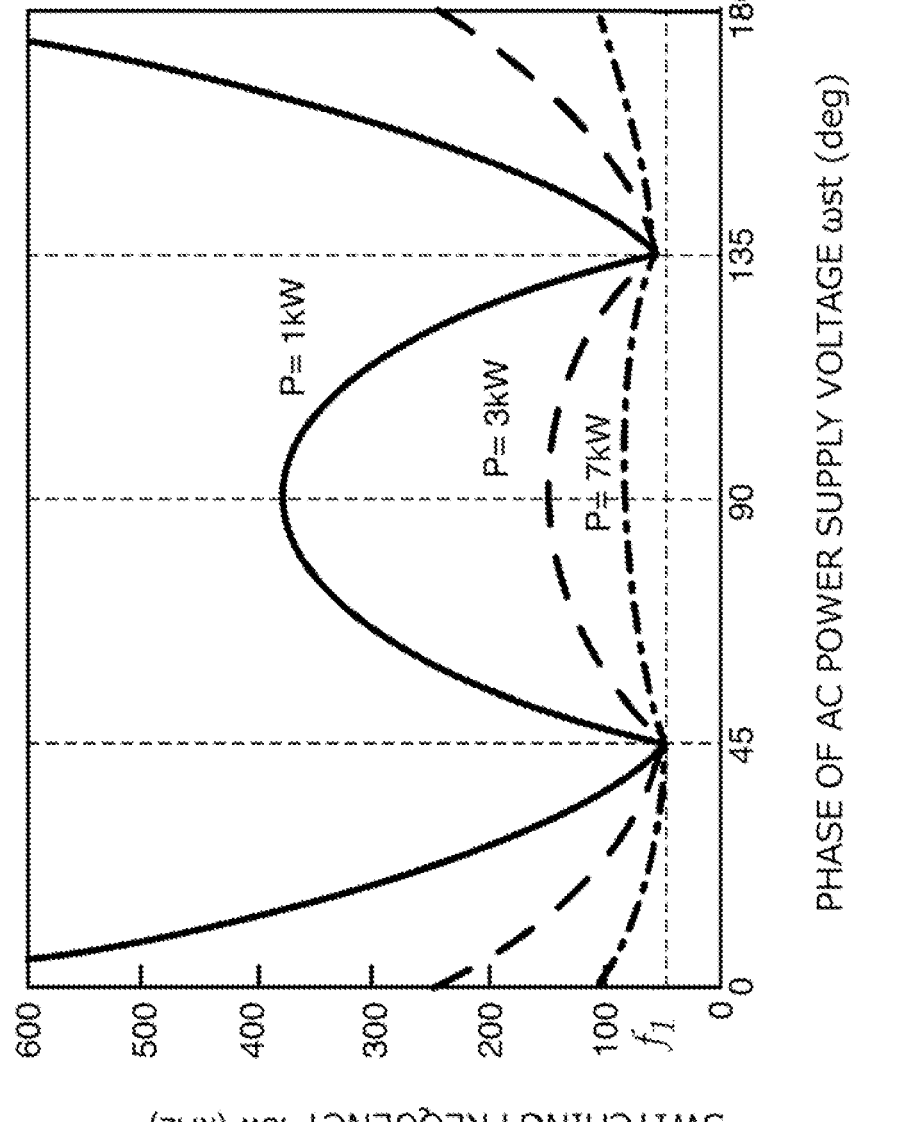
FIG. 6 shows an exemplar switching frequency $f_{SW}$ when a current set value $I_L'$ is optimized.

It is possible to operate the charger 100 more efficiently by optimizing a set value of the peak value $I_L'$ of the equivalent rectangular wave $i_L'$ (Non-Patent Documents 2 and 3). For example, the set value of the peak value $I_L'$ of the equivalent rectangular waveform $i_L'$ may be controlled so as to obtain a predetermined value (first frequency value) $f_1$ of the switching frequency $f_{SW}$ (the above formula (3)) at a phase cost of 45 degrees of the AC power supply voltage $v_S$ as shown in FIG. 6, whereby the charger 100 can be operated more efficiently. In this case, the set value $I_L'^*$ of the peak value $I_L'$ of the equivalent rectangular waveform $i_L'$ is determined as follows:

$$I_L'^* = \frac{V_{dc} + V_{Cmin}}{8f_1 L}\left[1 - \sqrt{1 - \frac{8f_1 L I_S(V_s + V_{dc})}{V_{dc}(V_{dc} + V_{Cmin})}}\right] \qquad (4)$$

$$v_{Cmin} = \sqrt{V_{Cmax}^2 - \frac{2P}{\omega_S C_{buf}}}$$

wherein $V_{Cmin}$ indicates a minimum value of the voltage applied to the buffer capacitor Cbuf. FIG. 6 shows an example of a change of the switching frequency $f_{SW}$ at output power values Pout of 1 KW, 3 kW and 7 KW of the DC/DC converter 120.

The controller 140 may control the switches S21 to S28 of the DC/DC converter 120 and the switch S31 of the power pulsation absorbing circuit 130 according to the discontinuous current mode during all phases of one period of the AC voltage $v_S$ inputted from the AC power supply 200, or may also control the switches S21 to S28 of the DC/DC converter 120 and the switch S31 of the power pulsation absorbing circuit 130 according to the continuous current mode during all phases of one period of the AC voltage $v_S$.

In addition, the controller 140 may also control the switches S21 to S28 of the DC/DC converter 120 and the first switch S31 of the power pulsation absorbing circuit 130 by combination of the continuous current mode mixed with the discontinuous current mode. For example, the controller 140 may control the switches S21 to S28 of the DC/DC converter 120 and the switch S31 of the power pulsation absorbing circuit 130 according to the continuous current mode during a first phase $T_{CCM}$ of one period of the AC voltage $v_S$, wherein the controller 140 may control the switches S21 to S28 of the DC/DC converter 120 and the switch S31 of the power pulsation absorbing circuit 130 according to the discontinuous current mode during another phase of this one period of the AC voltage $v_S$ (second phase $T_{DCM}$) which is different from the first phase TCCM.

Figure 7:
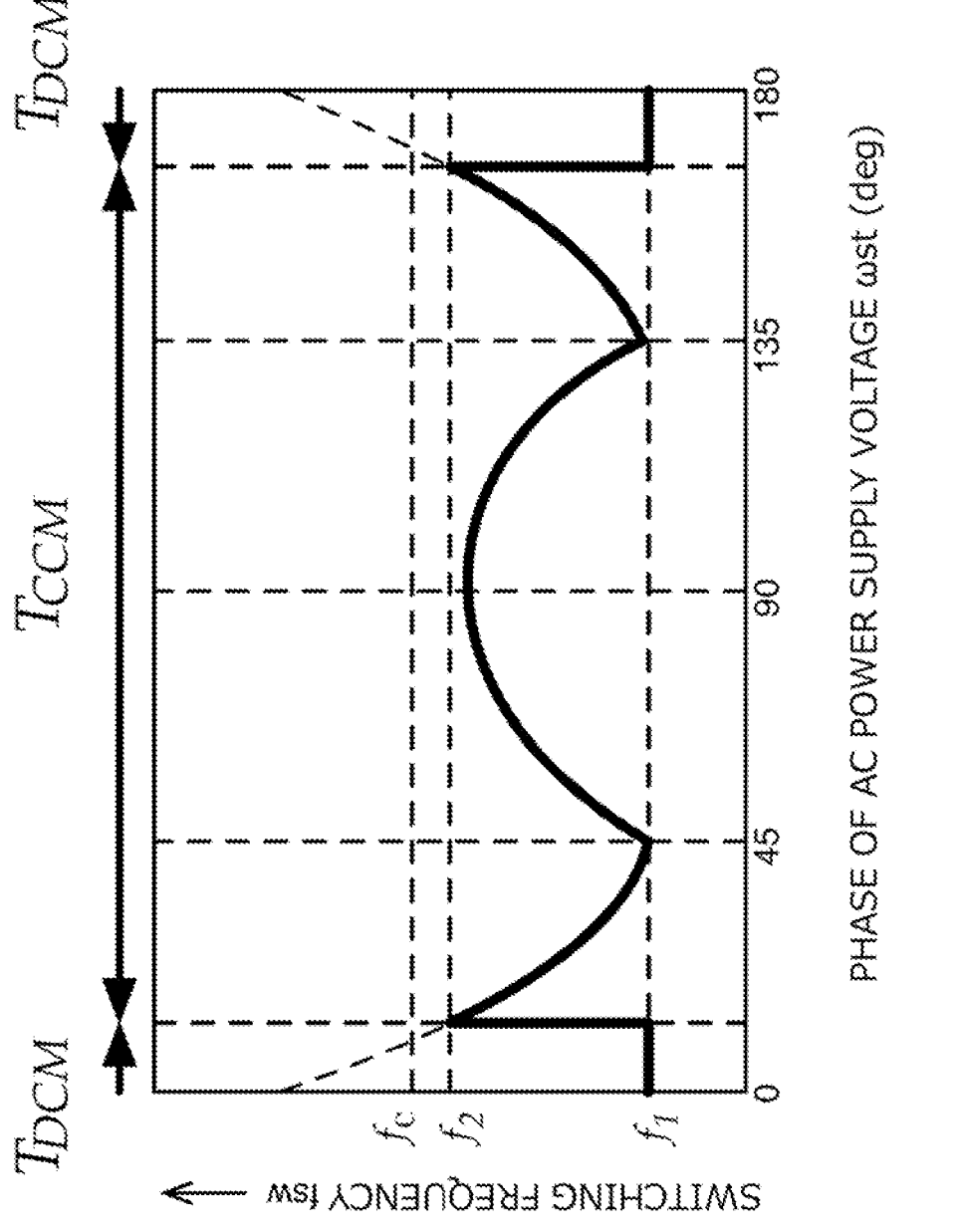
FIG. 7 shows an example of a change of the switching frequency $f_{SW}$ in the case of mixed operation with continuous and discontinuous current mode.
Figure 8:
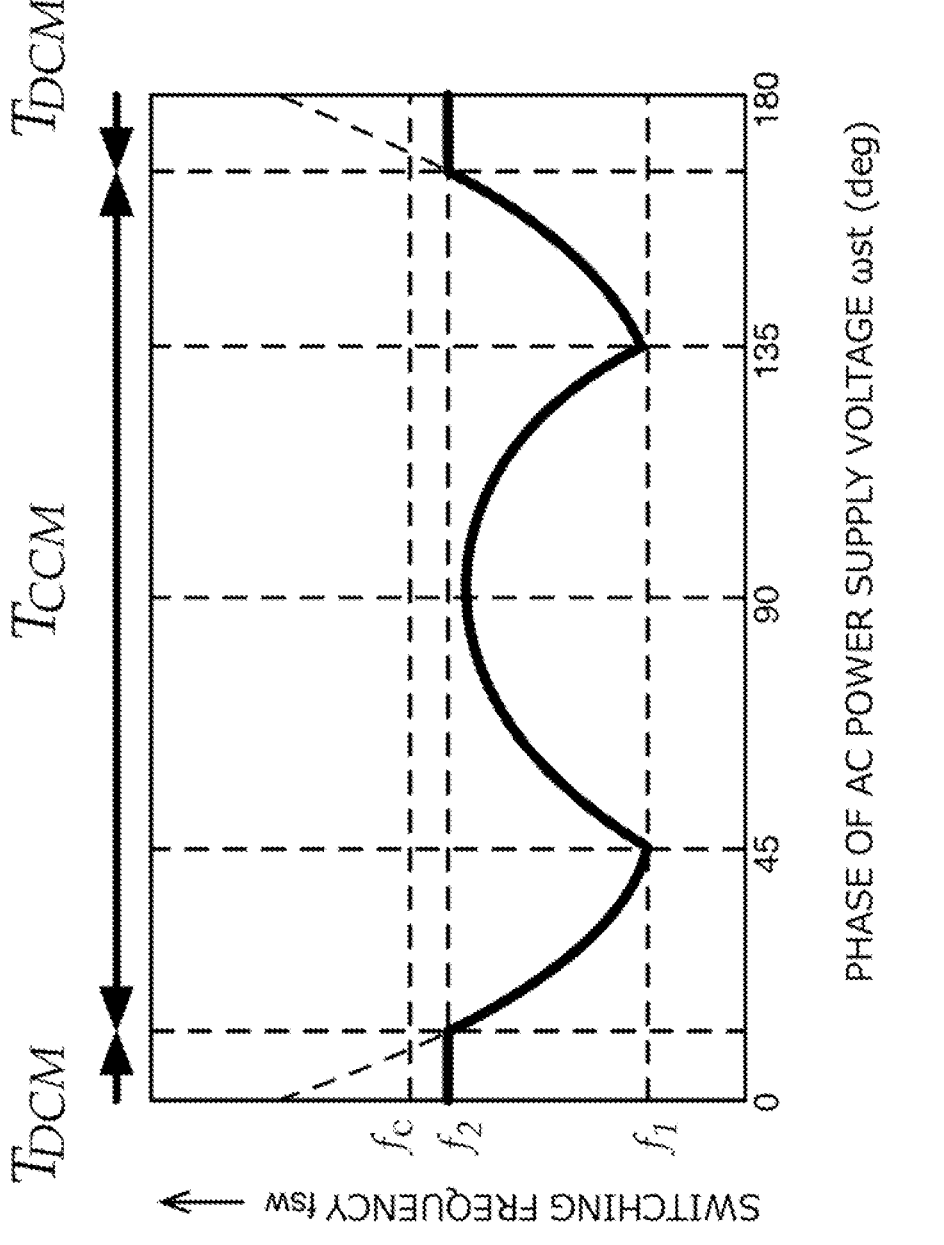
FIG. 8 shows an example of a change of the switching frequency $f_{SW}$ in the case of mixed operation with continuous and discontinuous current mode.

In this case, the first frequency value $f_1$ is selected to be smaller than an upper limit value fc for an operable frequency value of the switching frequency $f_{SW}$. Preferably, the controller 140 may further set the first phase $T_{CCM}$ such that a maximum value of the switching frequency $f_{SW}$ is equal to or smaller than a second frequency value $f_2$ which is greater than the first frequency value $f_1$, as shown in FIG. 7. The second frequency value $f_2$ is equal to or smaller than the upper limit value fc for the operable frequency value of the switching frequency $f_{SW}$, wherein the second frequency value $f_2$ is selected appropriately:

The switching frequency $f_{SW}$ for the second phase $T_{DCM}$ may have the first frequency value $f_1$ as shown in FIG. 7, or may have the second frequency value $f_2$ as shown in FIG. 8. In FIG. 8, the maximum value of the switching frequency $f_{SW}$ is the second frequency value $f_2$. When the switching frequency $f_{SW}$ for the second phase $T_{DCM}$ is the second frequency value $f_2$, smoother operation can be achieved as compared to operation with the switching frequency $f_{SW}$ for the second phase $T_{DCM}$ which is equal to the first frequency value $f_1$. However, the discontinuous current mode includes hard switching operation. Such hard switching operation causes larger loss as the switching frequency $f_{SW}$ is higher. For this reason, better efficiency may be obtained with the switching frequency $f_{SW}$ for the second phase $T_{DCM}$ which is the first frequency value $f_1$, as compared to operation with the switching frequency $f_{SW}$ for the second phase $T_{DCM}$ which is equal to second frequency value $f_2$.

<Control of the Switches for Switching from Mode 3 to Mode 4>

The DC/DC converter 120 is a DAB converter and includes full bridge circuits on both of the primary and secondary sides. When switches in a circuit with a full bridge circuit are switched from an off-state to an on-state, a dead time is provided in which all switches of a leg are switched off which includes a switch to be switched, in order to prevent all switches of the same leg from being switched on and thus prevent the circuit from being short-circuited.

In the discontinuous current mode (waveform as shown in FIG. 4)/continuous current mode (waveform as shown in FIG. 5), dead times are provided for switching from mode 1 to mode 2, for switching from mode 3 to mode 4, for switching from mode 4 to mode 6, and for switching from mode 7 to mode 1. It is to be noted that in the discontinuous current mode (waveform as shown in FIG. 4), it is not necessary to provide a dead time for switching from mode 5 to mode 1 and for switching from mode 5 to mode 4, since all switches S21 to S28 of the DC/DC converter 120 are switched off in the mode 5 of the discontinuous current mode (waveform as shown in FIG. 4).

In the discontinuous current mode (waveform as shown in FIG. 4), the first switch S31 of the power pulsation absorbing circuit 130 is switched from the off-state to the on-state when switching from mode 3 to mode 4, when switching from mode 5 to mode 4, and when switching from mode 6 to mode 7. In the continuous current mode (waveform as shown in FIG. 5), the first switch S31 of the power pulsation absorbing circuit 130 is switched from the off-state to the on-state when switching from mode 3 to mode 4 and when switching from mode 6 to mode 7. Therefore, in the discontinuous current mode (waveform as shown in FIG. 4) and the continuous current mode (waveform as shown in FIG. 5), the time of the dead time is overlapped with the time of switching the first switch S31 of the power pulsation absorbing circuit 130 from the off-state to the on-state only when switching from mode 3 to mode 4.

Figure 9:
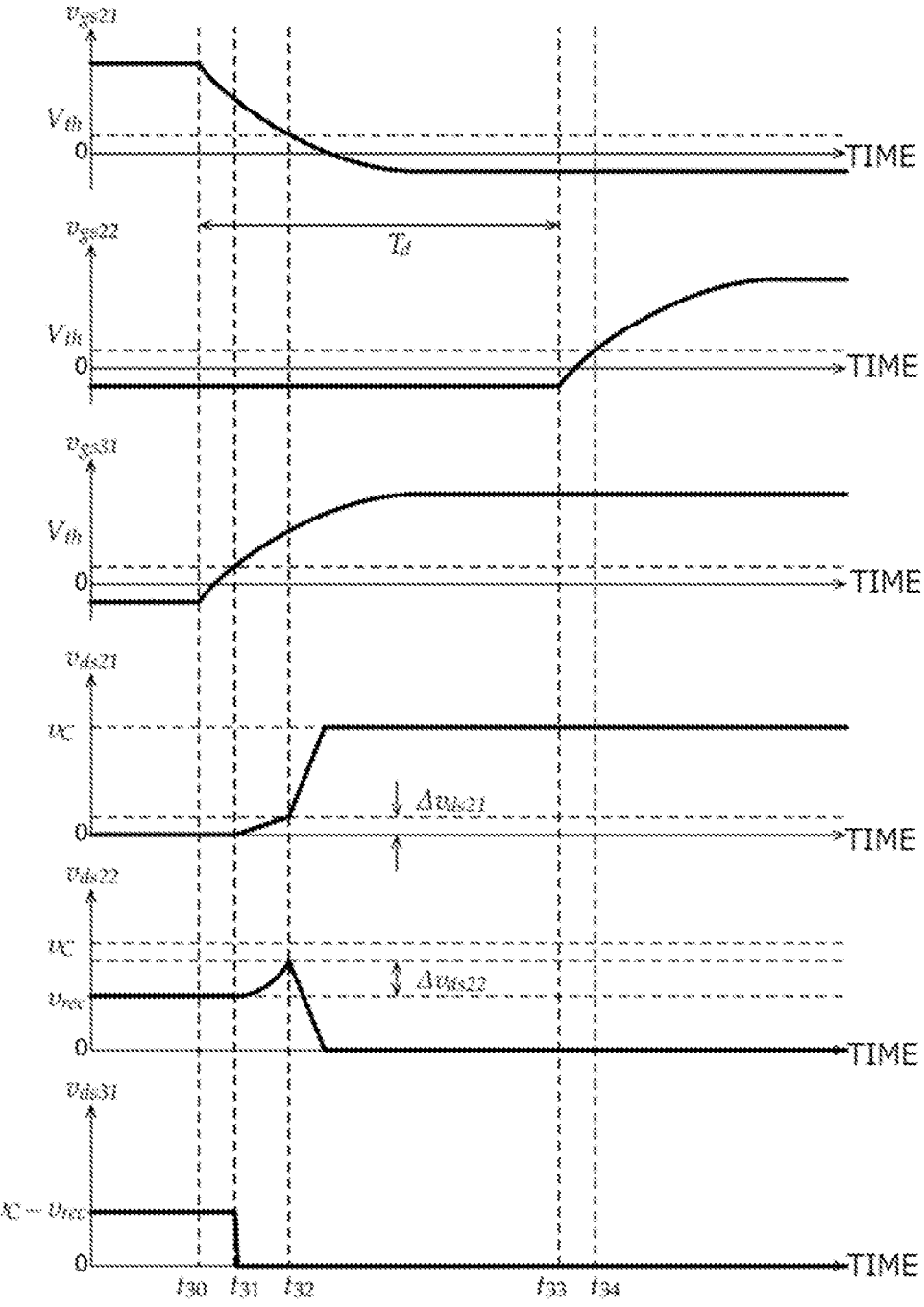
FIG. 9 shows an example of changes of gate-source voltages $v_{gs21}$, $v_{gs22}$ and $v_{gs31}$ as well as drain-source voltages $v_{ds21}$, $v_{ds22}$, and $v_{ds31}$ of a first switch and a second switch of the DC/DC converter 120 and a first switch S31 of a power pulsation absorbing circuit 130 during switching from mode 3 to mode 4.

FIG. 9 shows an example of changes of gate-source voltages $v_{gs21}$, $v_{gs22}$ and $v_{gs31}$ as well as drain-source voltages $v_{ds21}$, $v_{ds22}$, and $v_{ds31}$ of a first switch S21 and a second switch S2 of the DC/DC converter 120 and a first switch S31 of a power pulsation absorbing circuit 130 during switching from mode 3 to mode 4.

As shown in FIG. 9, for switching from mode 3 to mode 4, the dead time Ta is provided between time $t_{30}$ and time $t_{33}$, wherein at time $t_{30}$, a gate signal applied to the first switch S21 of the DC/DC converter 120 is from an on signal (High-signal) to an off signal (Low-signal) (the gate-source voltage $v_{gs21}$ begins to be reduced), wherein at time $t_{33}$, a gate signal applied to the second switch S22 of the DC/DC converter 120 is switched from an off signal to an on signal (the gate-source voltage $v_{gs22}$ begins to be increased).

Figure 10:
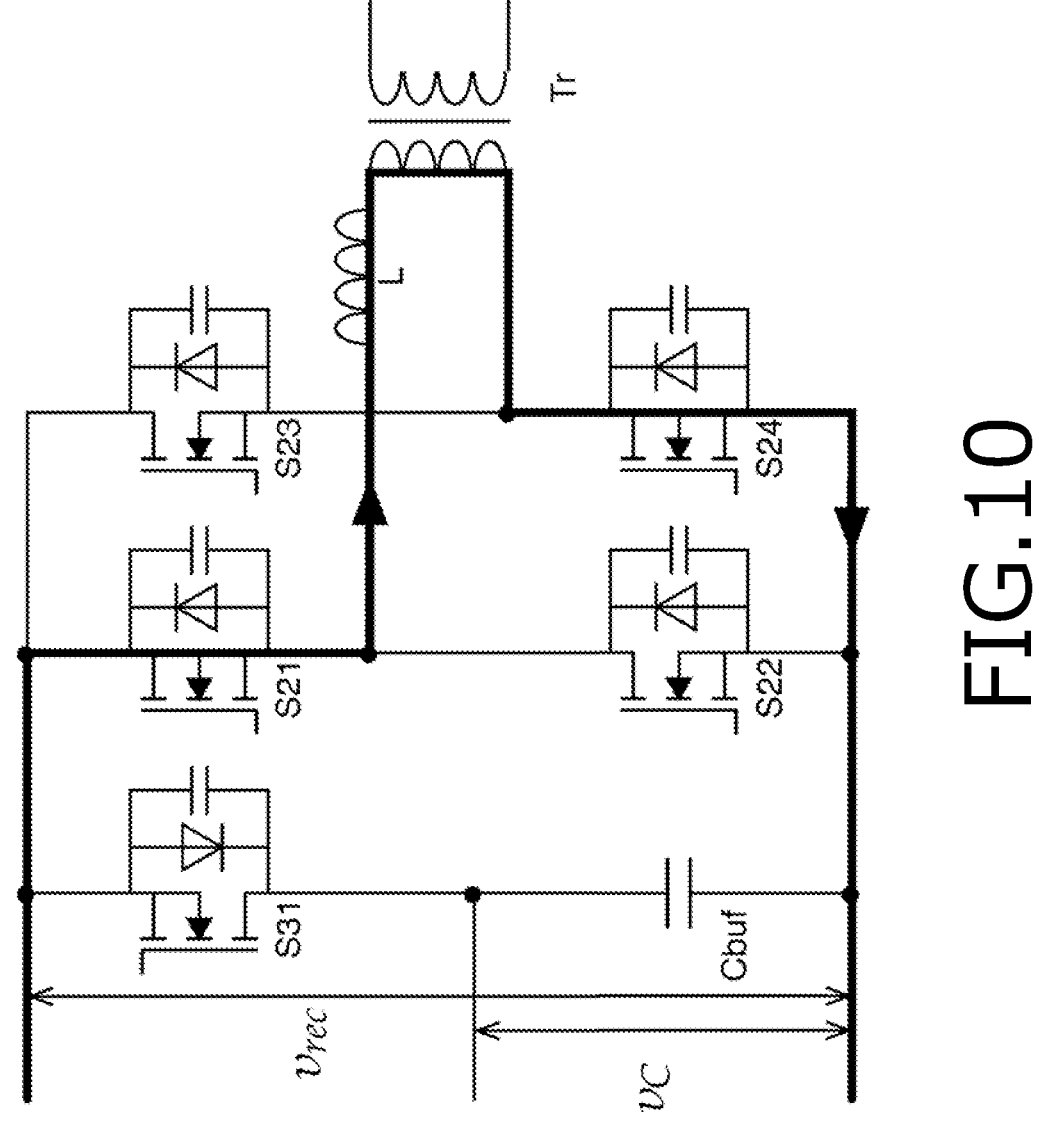
FIG. 10 shows a diagram for explanation of a current flow before time $t_{30}$ according to FIG. 9.

Before time $t_{30}$, a current as shown in FIG. 10 flows and an output capacitance of the first switch S31 of the power pulsation absorbing circuit 130 is charged with a power with a voltage $v_c$-$v_{rec}$. If a time for switching the gate signal applied to the first switch S31 of the power pulsation absorbing circuit 130 from the off signal to the on signal (the gate-source voltage $v_{gs31}$ begins to be increased) is selected to coincide with the time $t_{30}$ of switching the gate signal applied to the first switch S21 of the DC/DC converter 120 from the on-state to the off-state, this first switch S31 of the power pulsation absorbing circuit 130 is switched on before the output capacitance of the first switch S31 of the power pulsation absorbing circuit 130 which has been charged is discharged (before the drain-source voltage $v_{ds31}$ becomes zero), as shown in FIG. 9. This means that switching of the first switch S31 of the power pulsation absorbing circuit 130 from the off-state to the on-state becomes hard switching. Therefore, if the time for switching the gate signal applied to the first switch S31 of the power pulsation absorbing circuit 130 from the off signal to the on signal is selected to coincide with the time $t_{30}$ of switching the gate signal applied to the first switch S21 of the DC/DC converter 120 from the on signal to the off signal, the above-mentioned hard switching may cause switching loss.

In the example shown in FIG. 9, the time $t_{31}$ at which the gate-source voltage $v_{gs31}$ of the first switch S31 of the power pulsation absorbing circuit 130 exceeds a threshold voltage $V_{th}$ and the first switch S31 of the power pulsation absorbing circuit 130 is thus switched on is earlier than the time $t_{32}$ at which the gate-source voltage $v_{gs31}$ of the first switch S31 of the power pulsation absorbing circuit 130 is reduced below the threshold voltage $V_{th}$ and the first switch S21 of the DC/DC converter 120 is switched off. Therefore, at the time $t_{31}$, an electrostatic energy $w_{31}$ stored in the output capacitance of the first switch S31 of the power pulsation absorbing circuit 130 will be consumed by an on-resistance of the first switch S31 of the power pulsation absorbing circuit 130.

$$w_{31} = \frac{1}{2}C_{OSS31}(v_C - v_{rec})^2$$

wherein $C_{OSS31}$ indicates a capacitance value of the output capacitance of the first switch S31 of the power pulsation absorbing circuit 130.

Furthermore, a current flows into an output capacitance of the second switch S22 of the DC/DC converter 120 from the buffer capacitor Cbuf between the time $t_{31}$ and time $t_{32}$ and the output capacitance of the second switch S22 of the DC/DC converter 120 is thus charged, wherein a drain-source voltage $v_{22ds}$ of the second switch S22 of the DC/DC converter 120 is increased by $\Delta v_{ds22}$ to reach $v_{rec}+\Delta v_{ds22}$. At this time, if the drain-source voltage $v_{ds22}$ of the second switch S22 of the DC/DC converter 120 were increased to reach $v_C$, energy w21 for charging the output capacitance of the second switch S22 of the DC/DC converter 120 would be consumed by resistance components within the circuit, such as the on-resistance of the first switch S21 of the DC/DC converter 120.

$$w_{21} = \frac{1}{2}C_{OSS21}(v_C - v_{rec})^2$$

wherein $C_{OSS22}$ indicates a capacitance value of the output capacitance of the second switch S22 of the DC/DC converter 120.

Moreover, the current which charges the output capacitance of the second switch S22 of the DC/DC converter 120 is a sort of short-circuit current. Therefore, between time $t_{31}$ and time $t_{32}$, the drain-source voltage $v_{ds21}$ of the first switch S21 of the DC/DC converter 120 is increased by $\Delta v_{ds21}$ due to the on-resistance of the first switch S21 of the DC/DC converter 120. Therefore, conduction loss may be caused due to the inductor current $i_L$ and the increased amount $\Delta v_{ds21}$ by which the drain-source voltage $v_{ds21}$ of the first switch S21 of the DC/DC converter 120.

Figure 11:
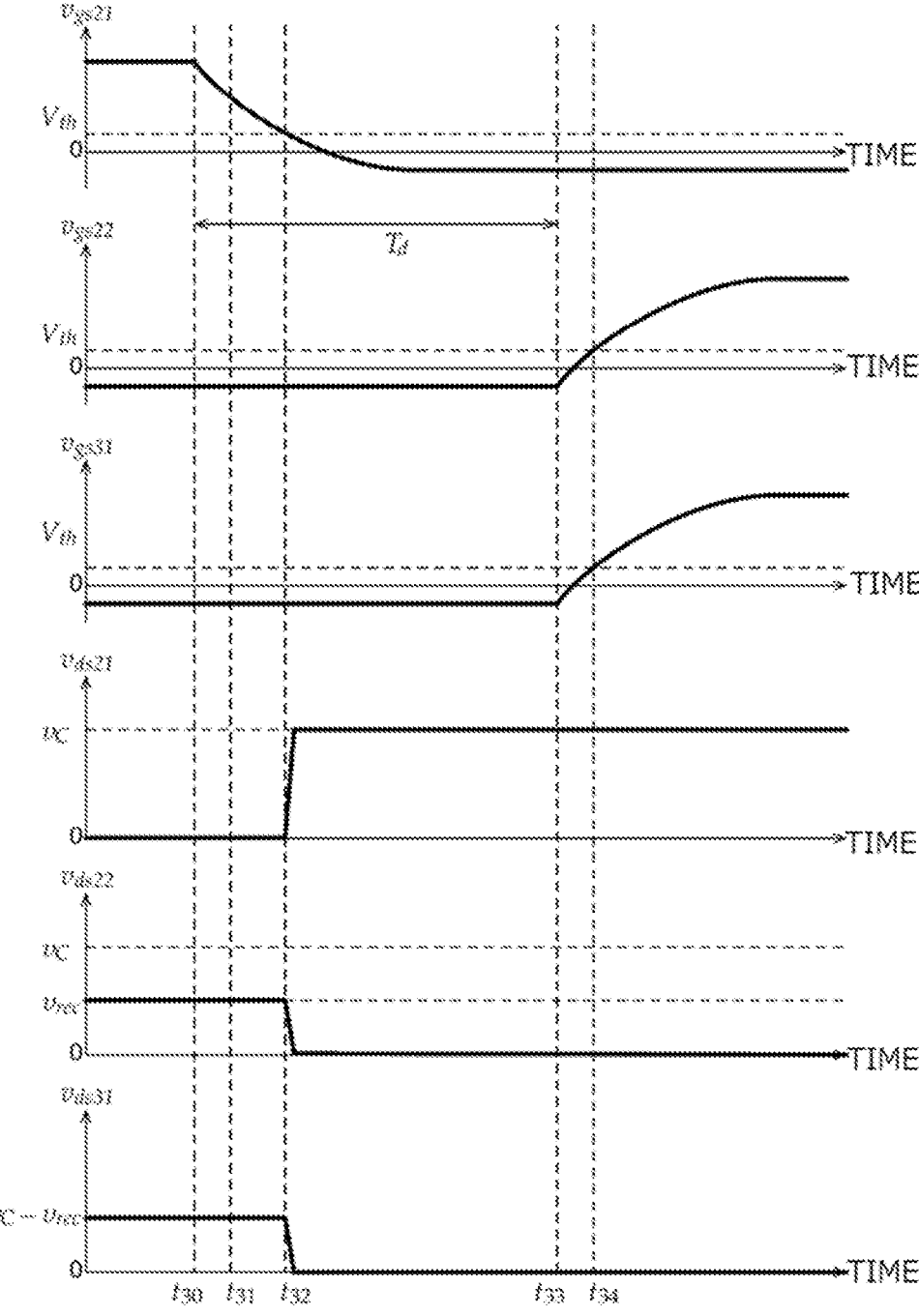
FIG. 11 shows an example of changes of gate-source voltages $v_{gs21}$, $v_{gs22}$ and $v_{gs31}$ as well as drain-source voltages $v_{ds21}$, $v_{ds22}$, and $v_{ds31}$ of a first switch and a second switch of the DC/DC converter 120 and a first switch S31 of a power pulsation absorbing circuit 130 during switching from mode 3 to mode 4.

Therefore, in the present embodiment, the controller 140 delays the time of switching the gate signal applied to first switch S31 of the power pulsation absorbing circuit 130 from the off signal to the on signal later than the time $t_{30}$ of switching the gate signal applied to the first switch S21 of the DC/DC converter 120 from the on signal to the off signal (that is, time of beginning the dead time $T_d$), as shown in FIG. 11. This means that a time of expiration of a predetermined time after beginning the dead time Ta is selected as the time of switching the gate signal applied to the first switch S31 of the power pulsation absorbing circuit 130 from the off signal to the on signal. In this case, the predetermined time may preferably have a length equal to or smaller than the dead time Ta, wherein the time of switching the gate signal applied to the first switch S31 of the power pulsation absorbing circuit 130 from the off signal to the on signal may be preferably set after the power stored in the output capacitance of the first switch S31 of the power pulsation absorbing circuit 130 is discharged (i.e., after the drain-source voltage $v_{ds31}$ becomes zero), as shown in FIG. 11. This means that during the time until expiration of the predetermined time after beginning the dead time $T_d$, the controller 140 provides the gate signal for controlling the first switch S31 of the power pulsation absorbing circuit 130 to be off, wherein at the time at which the predetermined time elapses after beginning the dead time $T_d$, the controller 140 switches the gate signal for controlling the first switch S31 of the power pulsation absorbing circuit 130 from the off-state to the on-state.

In the example as shown in FIG. 11, the time of switching the gate signal applied to the first switch S31 of the power pulsation absorbing circuit 130 from the off signal to the on signal is delayed by the dead time Ta as compared to the time $t_{30}$ of switching the gate signal applied to the first switch S21 of the DC/DC converter 120 from the on signal to the off signal, whereby the time of switching the gate signal applied to the first switch S31 of the power pulsation absorbing circuit 130 from the off signal to the on signal is set to coincide with the time $t_{33}$ of switching the gate signal applied to the second switch S22 of the DC/DC converter 120 from the off signal to the on signal. Namely, in the example as shown in FIG. 11, the controller 140 provides the gate signal for controlling the first switch S31 of the power pulsation absorbing circuit 130 to be off during the dead time Ta which is provided between mode 3 and mode 4.

Namely, according to the present embodiment, in case where control of switching of the DC/DC converter 120 by the controller 140 includes a first mode (mode 3 in the above example of control) and a second mode (mode 4 in the above example of control), the controller 140 is configured to provide a dead time between the first mode and the second mode when switching from the first mode to the second mode, and control the first switch S31 of the power pulsation absorbing circuit 130 to be in an off-state during a time until expiration of a predetermined time after start of the dead time, wherein in the first mode, at least one switch of the switches S21 to S28 of the DC/DC converter 120 (the first switch S21 of the DC/DC converter 120 in the above example of control) is switched on, at least one switch of the switches S21 to S28 of the DC/DC converter 120 (the second switch S22 of the DC/DC converter 120 in the above example of control) is switched off, and the first switch S31 of the power pulsation absorbing circuit 130 is switched off, and wherein in the second mode, the switch of the DC/DC converter 120 which is switched off in the first mode (the second switch S22 of the DC/DC converter 120 in the above example of control) is switched on, and the first switch S31 of the power pulsation absorbing circuit 130 is switched on.

If a time for switching the gate signal applied to the first switch S31 of the power pulsation absorbing circuit 130 from the off signal to the on signal is selected to coincide with the time $t_{33}$ of switching the gate signal applied to the second switch S22 of the DC/DC converter 120 from the off signal to the on signal, the first switch S31 of the power pulsation absorbing circuit 130 is switched on after the power stored in the output capacitance of the first switch S31 of the power pulsation absorbing circuit 130 is discharged (after the drain-source voltage $v_{ds31}$ has become zero), as shown in FIG. 11. According to the present embodiment, switching of the first switch S31 of the power pulsation absorbing circuit 130 thus becomes zero voltage switching (ZVS), i.e., soft switching. Therefore, the present embodiment enables the efficiency to be prevented from being reduced. As a result, the present embodiment enables a compact and efficient charger to be provided which allows pulsation of power to be absorbed.

Figure 12:
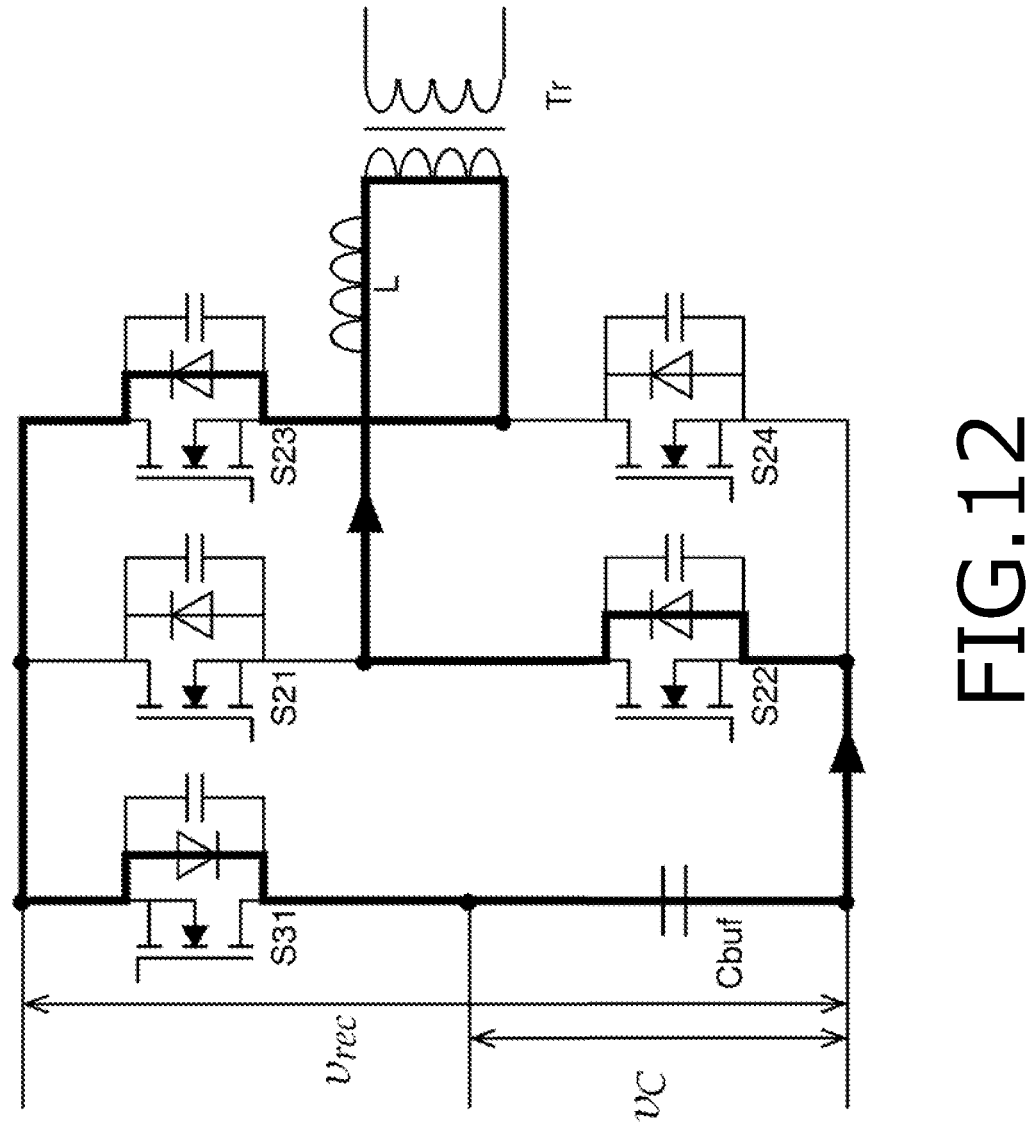
FIG. 12 shows a diagram for explanation of a current flow between time $t_{32}$ and time $t_{34}$ according to FIG. 11.

In the example shown in FIG. 11, the time $t_{34}$ at which the gate-source voltage $v_{gs31}$ of the first switch S31 of the power pulsation absorbing circuit 130 exceeds a threshold voltage $V_{th}$ and the first switch S31 of the power pulsation absorbing circuit 130 is thus switched on is later than the time $t_{32}$ at which the gate-source voltage $v_{gs31}$ of the first switch S31 of the power pulsation absorbing circuit 130 is reduced below the threshold voltage $V_{th}$ and the first switch S21 of the DC/DC converter 120 is switched off. Thus, the output capacitance of the first switch S31 of the power pulsation absorbing circuit 130 with a voltage of $v_C$-$v_{rec}$ which has been charged is discharged as shown in FIG. 11 by a current flow during a time from time $t_{32}$ to time $t_{34}$ as shown in FIG. 12.

Although the present invention has been described above with reference to voltage decrease operation by way of example, the charger 100 according to the present embodiment may perform voltage increase operation (S. Komeda, S. Takuma and Y. Ohnuma, "Boost Operation of a Dual-Active-Bridge AC-DC Converter with an Active Energy Buffer," 2022 IEEE Energy Conversion Congress and Exposition (ECCE), Detroit, MI, USA, 2022, pp. 1-6, doi: 10.1109/ECCE50734.2022.9948064). The present invention as described above may be applied to the voltage increase operation.

The present invention has been described above by means of the preferable embodiment thereof. Although the invention has been described herein by presenting a specific example, various modifications and changes may be made to such an example without departing from the spirit and scope of the invention as set forth in the claims.

REFERENCE SIGNS LIST

100 Charger
110 Rectifier
120 DC/DC converter
S21-S28 Switches of the DC/DC converter
130 Power pulsation absorbing circuit
D31 First diode
D32 Second diode
D33 Third diode
Lb Inductor
Cbuf Buffer capacitor
S31 First switch
S32 Second switch
200 AC power supply
300 Battery

What is claimed is:
1. A charger comprising:
a rectifier including two input terminals, a cathode terminal and an anode terminal, wherein the two input terminals are configured for connection to an AC power supply;
a DC/DC converter including a first terminal, a second terminal and two output terminals, the first terminal being configured to be connected to the cathode terminal of the rectifier via a first line, the second terminal being configured to be connected to the anode terminal of the rectifier via a second line, wherein the output terminals are configured for connection to a battery;
a power pulsation absorbing circuit including a first diode, a second diode, a third diode, an inductor, a capacitor, a first switch and a second switch; and
a controller configured to control switching of switches of the DC/DC converter and switching of the first switch and the second switch,
wherein the first diode is connected between the inductor of the power pulsation absorbing circuit and one of the two input terminals of the rectifier, and the second diode is connected between the inductor and another of the two input terminals of the rectifier,
wherein the capacitor and the first switch are connected in series between the first line and the second line with the capacitor being arranged closer to the second line than the first switch,
wherein the third diode is connected between the inductor of the power pulsation absorbing circuit and a line which connects the capacitor to the first switch,
wherein the second switch is connected between the second line and a line which connects the inductor of the power pulsation absorbing circuit to the third diode,
wherein in case where control of switching of the DC/DC converter by the controller includes a first mode and a second mode, the controller is configured to:

provide a dead time between the first mode and the second mode when switching from the first mode to the second mode; and control the first switch of the power pulsation absorbing circuit to be in an off-state during a time until expiration of a predetermined time after start of the dead time, wherein in the first mode, at least one switch of the switches of the DC/DC converter is switched on, at least one switch of the switches of the DC/DC converter is switched off, and the first switch of the power pulsation absorbing circuit is switched off, and wherein in the second mode, the switch of the DC/DC converter which is switched off in the first mode is switched on, and the first switch of the power pulsation absorbing circuit is switched on.

2. The charger according to claim 1, wherein the DC/DC converter includes a leg on a primary side, the leg including a first switch and a second switch, wherein in the first mode, the first switch of the DC/DC converter is switched on, and the second switch of the DC/DC converter and the first switch of the power pulsation absorbing circuit are switched off, and wherein in the second mode, the first switch of the DC/DC converter is switched off, and the second switch of the DC/DC converter and the first switch of the power pulsation absorbing circuit are switched on.

3. The charger according to claim 1, wherein on a primary side, the DC/DC converter includes a leg with a first switch and a second switch and a leg with a third switch and a fourth switch, wherein in the first mode, the first switch and the fourth switch of the DC/DC converter are switched on, and the second switch and the third switch of the DC/DC converter as well as the first switch of the power pulsation absorbing circuit are switched off, and wherein in the second mode, the first switch and the fourth switch of the DC/DC converter are switched off, and the second switch and the third switch of the DC/DC converter as well as the first switch of the power pulsation absorbing circuit are switched on.

4. The charger according to claim 1, wherein the controller is configured to control the switches of the DC/DC converter and the first switch according to a continuous current mode during one entire phase of an AC voltage inputted from the AC power supply.

5. The charger according to claim 4, wherein in the continuous current mode, the controller is configured to change switching frequencies of the switches of the DC/DC converter and the first switch.

6. The charger according to claim 5, wherein the controller is configured to:

control switching of the switches of the DC/DC converter and the first switch to obtain an operation waveform of the inductor of the DC/DC converter which is approximable by a rectangular waveform; and control a set value of a peak value of the rectangular waveform in such a manner that a minimum value of the switching frequencies becomes a first frequency value.

7. The charger according to claim 1, wherein the controller is configured to control the switches of the DC/DC converter and the first switch according to a discontinuous current mode during one entire period of an AC voltage inputted from the AC power supply.

8. The charger according to claim 7, wherein in the discontinuous current mode, the controller is configured not to change switching frequencies of the switches of the DC/DC converter and the first switch.

9. The charger according to claim 1, wherein the controller is configured to:

control the switches of the DC/DC converter and the first switch according to a continuous current mode during a first phase of one period of an AC voltage inputted by the AC power supply; and control the switches of the DC/DC converter and the first switch according to a discontinuous current mode during a phase of the period of the AC voltage which is different from the first phase.

10. The charger according to claim 1, wherein the DC/DC converter is configured as a DAB (Dual Active Bridge) converter.

* * * * *